United States Patent
Fedde et al.

(10) Patent No.: US 11,618,309 B2
(45) Date of Patent: Apr. 4, 2023

(54) AGRICULTURAL WORK MACHINE

(71) Applicant: CLAAS Tractor SAS, Vélizy-Villacoublay (FR)

(72) Inventors: Thomas Fedde, Delbrück (DE); Philipp Heymann, Möhnesee Wamel (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 0 days.

(21) Appl. No.: 17/364,960

(22) Filed: Jul. 1, 2021

(65) Prior Publication Data
US 2022/0001739 A1    Jan. 6, 2022

(30) Foreign Application Priority Data

Jul. 1, 2020   (DE) .......................... 102020117283.4

(51) Int. Cl.
*B60K 6/48*    (2007.10)
*B60K 6/52*    (2007.10)
(Continued)

(52) U.S. Cl.
CPC ................. *B60K 6/48* (2013.01); *B60K 6/12* (2013.01); *B60K 6/30* (2013.01); *B60K 6/52* (2013.01);
(Continued)

(58) Field of Classification Search
CPC ...... B60Y 2200/221; B60K 6/48; B60K 6/12; B60K 6/30; B60K 6/52; B60K 17/28; B60K 2006/4825
See application file for complete search history.

(56) References Cited

U.S. PATENT DOCUMENTS 1,613,646 A  *  1/1927  Dailey ................. B60K 17/046
                                            475/6
10,479,187 B2   11/2019  Lubben et al.
(Continued)

FOREIGN PATENT DOCUMENTS

DE   102011102265 A1   4/2012
DE   102016005804 A1   11/2017
(Continued)

OTHER PUBLICATIONS

European Search Report for European application No. 21176812.2-1012 dated Sep. 29, 2021.

*Primary Examiner* — Tisha D Lewis
(74) *Attorney, Agent, or Firm* — Lempia Summerfield Katz LLC

(57) ABSTRACT

An agricultural work machine comprising a front axle and a rear axle, an internal combustion engine, at least one hybrid module, and a transmission device is disclosed. The internal combustion engine and the hybrid module are each operatively connected to the transmission device with both output power from the internal combustion engine and output power from the hybrid module absorbed via the transmission device. The output powers are transferred together to the rear axle so that rear wheels of the agricultural work machine arranged on the rear axle can be driven. The internal combustion engine is arranged in a front region of the agricultural work machine and the hybrid module is arranged in a rear region of the agricultural work machine. The output powers from the internal combustion engine and the hybrid module are supplied separately to the transmission device.

18 Claims, 2 Drawing Sheets

(51) Int. Cl.
*B60K 17/00* (2006.01)
*B60K 6/12* (2006.01)
*B60K 6/30* (2007.10)
*B60K 17/28* (2006.01)

(52) U.S. Cl.
CPC ...... *B60K 17/28* (2013.01); *B60K 2006/4825* (2013.01); *B60Y 2200/221* (2013.01)

(56) References Cited

U.S. PATENT DOCUMENTS

2017/0284517 A1* 10/2017 Rekow ............ B60W 30/18063
2019/0160936 A1   5/2019 Lubben et al.
2019/0346036 A1* 11/2019 Ore ........................ B60K 6/365
2020/0079433 A1*  3/2020 Suzuki .................... B60K 1/04
2020/0114749 A1*  4/2020 Kreis ....................... B60K 6/52
2021/0122357 A1   4/2021 Xu et al.

FOREIGN PATENT DOCUMENTS

DE      102018218078 A1    5/2019
EP           3098106 A1   11/2016
WO    WO-2011042926 A1 *  4/2011  ........... B60K 17/356
WO         2018227310 A1   12/2018

* cited by examiner

AGRICULTURAL WORK MACHINE

CROSS REFERENCE TO RELATED APPLICATION

This application claims priority under 35 U.S.C. § 119 to German Patent Application No. DE 102020117283.4 filed Jul. 1, 2020, the entire disclosure of which is hereby incorporated by reference herein.

TECHNICAL FIELD

The present application relates to an agricultural work machine, such as a tractor, with an internal combustion engine and hybrid module each being operatively connected to a transmission device.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An agricultural work machine, such as a tractor, comprises a front axle and a rear axle that are each equipped with at least two wheels. The wheels may be formed by typical round wheels, wherein usually, each axle interacts with two wheels. It is also contemplated for one or both of the axles to interact with wheels of a chain drive, so that a particular axle may, for example, interact with four wheels (e.g., two wheels per side of the axle), and so that the wheels belonging to one side and assigned to each other interact with a drive chain.

Furthermore, the agricultural work machine may comprise an internal combustion engine through which output power may be provided for operating the agricultural work machine. The internal combustion engine may, for example, comprise a diesel engine. Furthermore, the agricultural work machine may comprise at least one hybrid module through which output power may also be provided for operating the agricultural work machine. The internal combustion engine and the hybrid module work together, for example, to drive the rear wheels. In this way, the combined output powers from the internal combustion engine and the hybrid module may propel or move the agricultural work machine. The same holds true for other power consumers, whether external power consumers and/or internal power consumers, of the agricultural work machine. For example, the combined output powers from the internal combustion engine and the hybrid module may propel or drive external work machines, such as, for example, a PTO shaft. Furthermore, the internal combustion engine and the hybrid module may supply power for internal consumers to consume, such as for generators, pumps, compressors, etc.

The hybrid module may, for example, be formed by an electric motor or a hydromotor. It is also contemplated that the hybrid module may comprise an electric machine or hydromachine which, beyond a motor function, may additionally be used conversely as a generator.

The agricultural work machine moreover comprises a transmission device that is in operative connection both with the internal combustion engine and with the hybrid module. The transmission device may be configured to absorb both the output power from the internal combustion engine and the output power from the hybrid module, and to combine the output powers with each other. The combined output power is then transmissible using the transmission device to the rear axle so that the rear wheels of the agricultural work machine positioned or arranged on the rear axle may be driven.

The internal combustion engine of the agricultural work machine is arranged in a front region thereof, wherein preferably at least 50% of the deadweight of the internal combustion engine is diverted into the ground through the front wheels. Advantageously, the internal combustion engine is arranged below a hood arranged in the front region, wherein the internal combustion engine is typically positioned directly above the front axle. It is therefore conventional for at least 90%, such as 100%, of the deadweight of the internal combustion engine to be diverted into the ground.

German published patent application DE102018218078A1 discloses an agricultural work machine that is equipped both with an internal combustion engine and with a hybrid module designed as an electric motor. The internal combustion engine and the electric motor may be used together to drive a drive axle as well as the wheels of the agricultural work machine associated with the drive axle, thereby enabling propulsion of the agricultural work machine. To accomplish this, the agricultural work machine has a transmission device through which the output powers of the internal combustion engine and the electric motor are summed and may be output together to drive the drive axle.

BRIEF SUMMARY OF THE INVENTION

Not Applicable

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
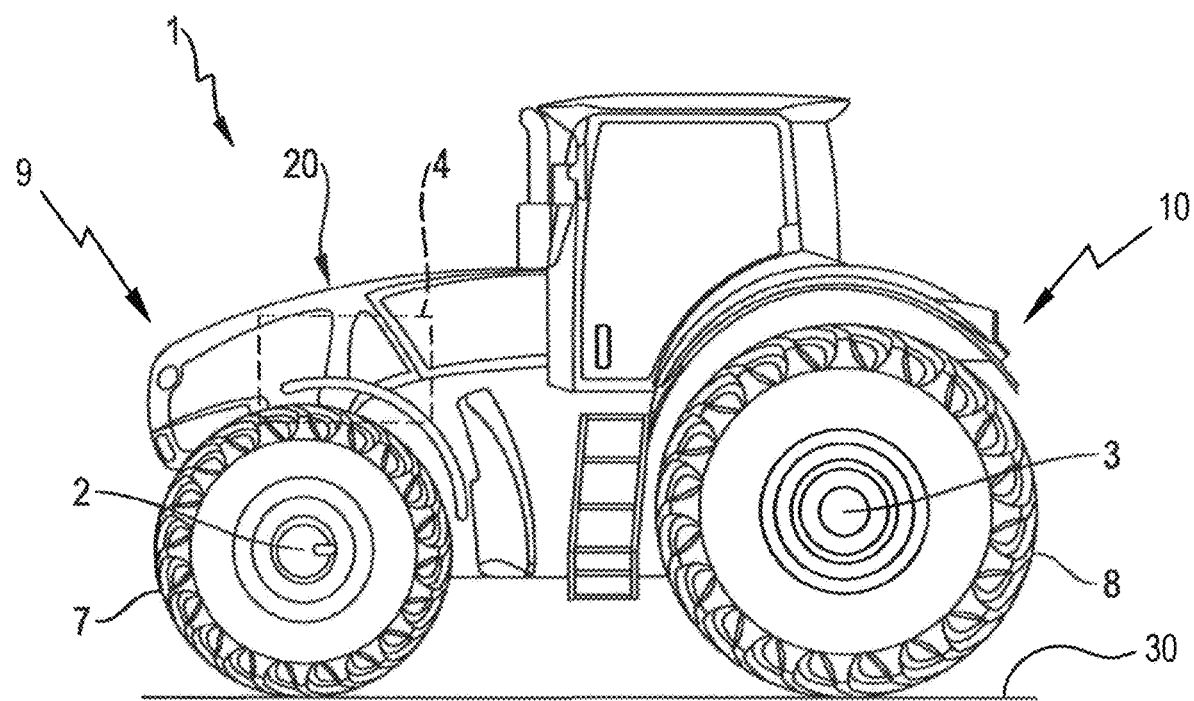
FIG. 1 illustrates a side view of a work machine according to the invention.

With conventional agricultural work machines, it may be disadvantageous that the drivetrain, through which the particular drive power is transferred to the drive axle, must be designed to sum the output powers from the internal combustion engine and from the particular hybrid module. This results in additional technical effort required on behalf of the drivetrain, wherein the design of the drivetrain must be configured based on the maximum system power that in practice, however, is actually only drawn on in individual cases. In this regard, the design of the drivetrain in the prior art is inefficient.

In one or some embodiments, an agricultural work machine includes a drivetrain is that is designed more efficiently than the prior art. In particular, the agricultural work machine may include: a front axle and rear axle; an internal combustion engine; at least one hybrid module; and a transmission device. The internal combustion engine and the hybrid module are each operatively connected to the transmission device. Further, the transmission device is configured to absorb both output power from the internal combustion engine and output power from the hybrid module. In addition, the agricultural work machine is configured to transfer the output power from the internal combustion engine and the output power from the hybrid module together to the rear axle to drive the rear wheels arranged on the rear axle. The internal combustion engine may be positioned in a front region of the agricultural work machine, and the hybrid module may be positioned in a rear region of the agricultural work machine. Moreover, the agricultural work machine is configured to separately supply the output powers of the internal combustion engine and the hybrid module to transmission device.

In this way, the agricultural work machine according to one embodiment includes the hybrid module being arranged or positioned in a rear region of the production engine, wherein the output powers from the internal combustion engine and from the hybrid module may be supplied separately to the transmission device through separate drivetrain sections. In particular, the internal combustion engine and the hybrid module may each be connected (such as separately connected) to the transmission device via their own respective output shafts or separate output shaft sections of a common main output shaft, wherein the transmission device has at least two inputs for the corresponding output shafts or the output shaft sections.

In one or some embodiments, the hybrid module is arranged or positioned proximate or close to the rear axle of the agricultural work machine. In particular, a center of gravity of the hybrid module may be arranged or positioned within an imaginary cylinder space generated or defined by rear wheels designed as a round wheels.

In one or some embodiments, at least 50% of the deadweight of the hybrid module is diverted through the rear wheels into the ground. In one or some embodiments, at least 90%, such as 100%, of the deadweight of the hybrid module is diverted through the rear wheels into the ground.

The agricultural work machine may have numerous advantages. In particular, the disclosed arrangement may rectify the provision of maximum output power from the internal combustion engine and hybrid module in terms of space. Accordingly, only the internal combustion engine is arranged or positioned in the front region of the agricultural work machine which, from the vantage point of mass distribution, in particular with respect to any equipment that may be suspended on a rear end of the agricultural work machine, is particularly advantageous. Accordingly, the internal combustion engine typically has a high mass that forms a counterweight to any suspended loads. The hybrid module is contrastingly arranged on the rear axle and may therefore be located in spatial proximity to the rear axle per se to which a significant portion of the output power from both the internal combustion engine as well as the hybrid module is to be directable. As a consequence of the arrangement of the hybrid module in the region of the rear axle, such as directly on the rear axle or integrated therein, the drivetrain section extending from the front-side internal combustion engine to the rear axle may be dimensioned for less output power in comparison to the prior art (i.e., only for that of the internal combustion engine), since the output power from the hybrid module is not already applied to the drivetrain in the front region as in the prior art, but rather only in the rear region of the agricultural work machine. The section over which all the output power (formed from the sum of the output powers of the internal combustion engine and the hybrid module) is directable or channeled to the rear axle via the drivetrain is thus comparatively short (e.g., shorter than the prior art).

In one or some embodiments, the transmission device is spatially arranged between the internal combustion engine and the hybrid module. In such an embodiment, the output power from the internal combustion engine to the transmission device is fed "from the front", and the output power from the hybrid module is fed "from the rear". With respect to the available installation space in the agricultural work machine, it may be very easily possible to arrange or position the transmission device between the internal combustion engine and the hybrid module.

As noted above, such an embodiment of the agricultural work machine may be particularly advantageous in which the hybrid module is integrated in the rear axle. In this case, at least 90%, such as 100%, of the deadweight of the hybrid module is diverted through the rear axles and therefore the rear wheels of the agricultural work machine into the ground. The integration of the hybrid module in the rear axle has the particular advantage that the section between the hybrid module and the rear axle is minimal, wherein moreover a section between the hybrid module and other consumers arranged in the rear end of the agricultural work machine is very short, so that at least part of the output power of the hybrid module only has to extend over a very short section to the particular consumers.

Moreover, such an embodiment of the agricultural work machine may be advantageous in which a flywheel damper that interacts with an output shaft or an output shaft section of the internal combustion engine is arranged or positioned in front of the transmission device viewed in the direction of the flow of force (e.g., upstream from the transmission device). As mentioned above, the output powers of the internal combustion engine and the hybrid module are discharged through separate output shafts or separate output shaft sections, wherein in particular the output powers are supplied separately to the transmission device. To dampen load peaks, the internal combustion engine may be assigned a flywheel damper that interacts with the output shaft of the internal combustion engine. The advantage of the arrangement of the flywheel damper in front of the transmission device is that the flywheel damper only has to be dimensioned for the output power of the internal combustion engine and not for both of the output power from the internal combustion engine and hybrid module. This is particularly advantageous with respect to the dimensioning of the flywheel damper, resulting in a more efficient design of the overall agricultural work machine.

Since the output powers of the internal combustion engine and the hybrid module may be combined using the transmission device, it may be necessary for a drivetrain section designed downstream from the transmission device, through which the combined output power is fed from the transmission device to the rear axle, to be designed for the sum of the output powers from the internal combustion engine and the hybrid module. In order to maximally exploit this efficiency advantage in the design of the agricultural work machine, it is correspondingly advantageous when the transmission device is spatially assigned to the rear axle so that a spatial distance between the transmission device and the rear axle, and therefore a length of the fully loaded drivetrain section through which the combined output powers are to be transmitted, is shorter (e.g., as short as possible). Advantageously, the transmission device may be assigned to the rear axle such that at least 50%, such as at least 75%, such as at least 85% of the deadweight of the transmission device is diverted through the rear wheels of the agricultural work machine into the ground.

In one or some embodiments, output shafts and/or output shaft sections of the internal combustion engine and the hybrid module are arranged or positioned coaxial or at a right angle to each other. Advantageously, the output shafts may be connected to each other so as to transmit torque, for example using a clutch, and thereby jointly form a main output shaft. This embodiment has the particular advantage that output power provided using the internal combustion engine may be transferred to the rear consumers of the agricultural work machine, wherein in one configuration, the main output shaft extends into the rear region of the agricultural work machine. In one or some embodiments, the output shaft of the internal combustion engine is coupled to the output shaft of the hybrid module, wherein the aforementioned consumers may also be connected to the main output shaft. Depending on the setting, the consumers may therefore be operated either with just the output power from the internal combustion engine, just the output power from the hybrid module, or combined output power from the internal combustion engine and hybrid module. The main output shaft may interact with at least one consumer, such as a plurality of consumers, in the rear region of the agricultural work machine. Such consumers may, for example, be any one, any combination or all of a generator (e.g., a power generator), such as a high-voltage generator, a hydraulic pump, and/or a PTO shaft.

In one or some embodiments, the agricultural work machine has at least one generator arranged or positioned in its rear region that, in particular, may be designed as a high-voltage generator. Such a generator is very highly suitable for supplying a socket located in the rear region with electrical current, wherein line costs and line losses are low given the short distances between the generator and the socket. The same advantage applies to the supply of high-voltage attachments that are connected to the agricultural work machine at a rear side thereof. These may be supplied very efficiently with electrical current using the generator arranged or positioned in the rear region.

Finally, such an embodiment of the agricultural work machine may be particularly advantageous in which a driveshaft of the internal combustion engine interacts with at least one consumer in the front region of the agricultural work machine. It is also contemplated in this case for the output shaft to interact with a plurality of consumers. This may, for example, be a front PTO shaft through which external equipment may be coupled to the agricultural work machine and thereby supplied with output power. It is furthermore contemplated for at least one pump and/or at least one generator to be connected to the output shaft of the internal combustion engine in the front region of the agricultural work machine.

Figure 2:
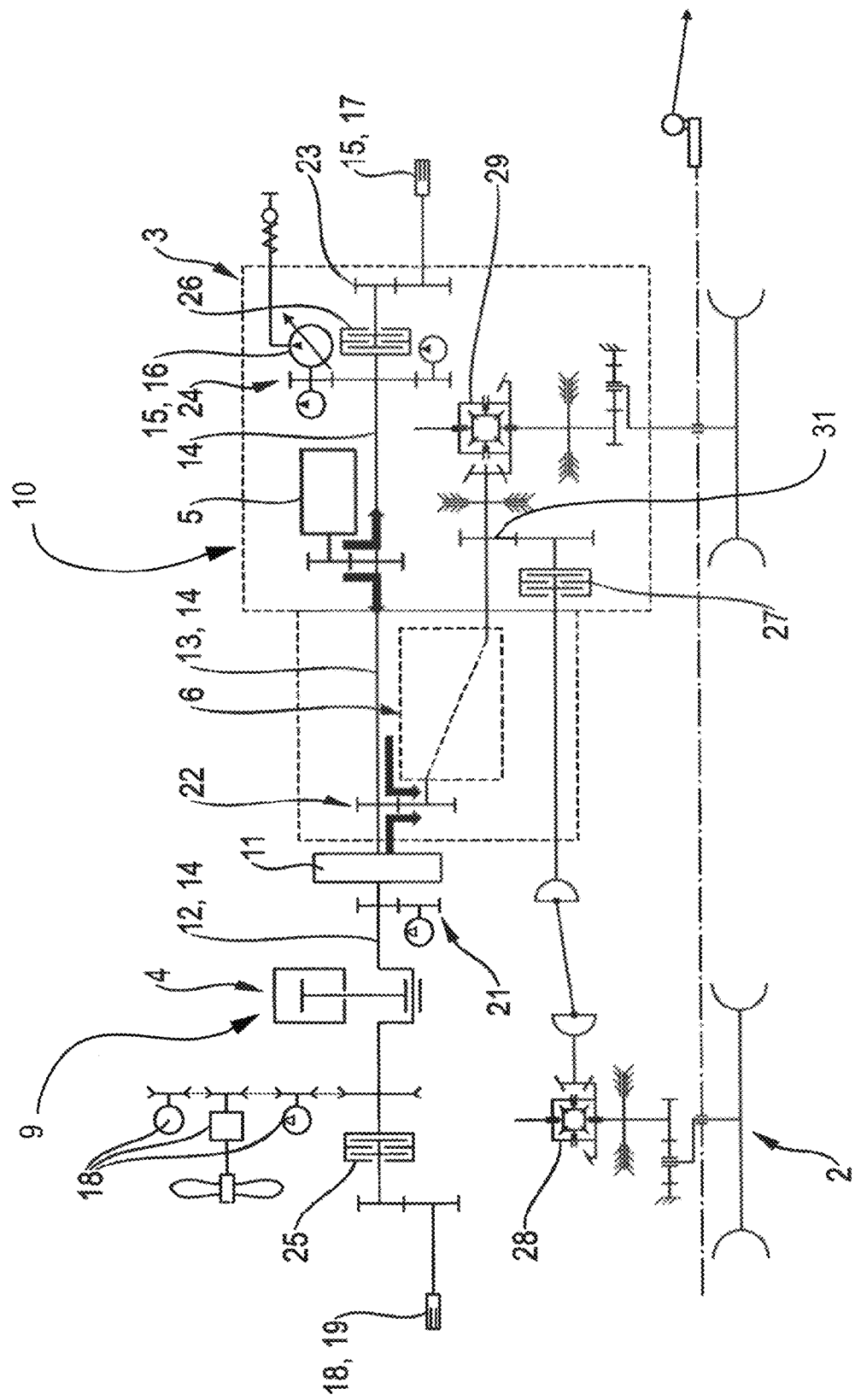
FIG. 2 illustrates a schematic representation of a drivetrain of the agricultural work machine according to the invention according to FIG. 1.

Referring to the figures, one exemplary embodiment that is shown in FIGS. 1 and 2 comprises an agricultural work machine 1 that may comprise a tractor. The agricultural work machine 1 comprises a front axle 2 and a rear axle 3, wherein two front wheels 7 designed as round wheels are arranged or positioned on the front axle 2, and two rear wheels 8 designed as round wheels are arranged or positioned on a rear axle 3. In a front region 9 of the agricultural work machine 1, the agricultural work machine 1 has a hood 20 below which an internal combustion engine 4 is located that is illustrated in FIG. 1 via a dashed line. In one or some embodiments, the internal combustion engine 4 comprises a diesel engine. The internal combustion engine 4 is assigned to the front axle 2 such that the dead weight of the internal combustion engine 4 is diverted or directed completely through the front axle 2 and the front wheels 7 into a ground 30.

The agricultural work machine 2, in addition to the internal combustion engine 4, furthermore comprises a hybrid module 5 that may comprise an electric motor. The hybrid module 5 may be assigned to the rear axle 3 according one embodiment, wherein the center of gravity of the hybrid module 5 is located in an imaginary cylinder space generated or defined by the rear wheels 8. In the illustrated example, the hybrid module 5 is integrated in the rear axle 3 so that in this case, 100% of the deadweight of the hybrid module 5 is diverted through the rear wheels 8 into the ground 30. The hybrid module 5 may therefore be assigned to a rear region 10 of the agricultural work machine 2.

The internal combustion engine 4 interacts with or is operationally connected to an output shaft 12 assigned thereto, through which output power of the agricultural work machine 4 can be directed to downstream consumers. In the illustrated shown, the output shaft 12 extends from the internal combustion machine 4 both toward a front end of the agricultural work machine 2 as well as toward a rear end. In this way, both front consumers 18 as well as rear consumers 15 may be supplied with corresponding power via the internal combustion engine 4. At the front end, the agricultural work machine 1 has, for example, a PTO shaft 19 that may be coupled as needed to the output shaft 12 via a clutch 25. Furthermore, the output shaft 12 may be operatively connected to other consumers 18 that may comprise, for example, any one, any combination, or all of a compressor, a ventilator and a generator. In addition, a brake 21 is arranged or positioned on the output shaft 12 of the internal combustion engine 4, through which brake torque may be applied to the output shaft 12. Furthermore, the driveshaft 12 may interact with a flywheel damper 11. This, viewed in the direction of the flow of force, is arranged or positioned on the near side of a transmission device 6 that interacts with the output shaft 12 (e.g., the hybrid module 5, viewed from the internal combustion engine 4, is positioned on a side of at least one consumer 15). The output shaft 12 may be supplied to the transmission device 6 from the front region 9 of the agricultural work machine 1, wherein the transmission device 6 has a corresponding input.

The hybrid module 5 for its part may also interact with an output shaft 13 that extends both toward the front region 9 as well as toward a rear end of the agricultural work machine 1. In the illustrated example, the transmission device 6 is connected directly to the rear axle 3, wherein the output shaft 13 of the hybrid module 5 only extends over a short section from the hybrid module 5 to the transmission device 6. The output shaft 12 of the internal combustion engine 4 in contrast runs from the front region 9 to the transmission device 6 assigned to the rear region 10. The transmission device 6 is assigned to the rear axle 3 such that at least a 75% of its deadweight is diverted through the rear axle 3 and therefore the rear wheels 8 into the ground 30. Proceeding from the output shafts 12, 13, output powers from the internal combustion engine 4 and the hybrid module 5 are branched via a junction 22 and thereby supplied to the transmission device 6. In the region of the rear axle 3, this interacts with a differential gear 29 through which the output powers are distributed to the two rear wheels 8. Furthermore, downstream from the transmission device 6 is another junction 31, through which part of the output power may be supplied via a clutch 27 to the front axle 2 as needed. The front axle 2 may also be equipped with a differential gear 28 so that a distribution of force to the two front wheels 7 may also occur here as well.

Since the internal combustion engine 4 and the hybrid module 5 supply their respective output powers to the transmission device 6 separately from each other via assigned output shafts 12, 13, the output shafts 12, 13 do not have to be designed for a sum of the output powers from the internal combustion engine 4 and the hybrid module 5 (e.g., the output shafts 12, 13 are designed to accommodate less than a sum of the output power of the internal combustion engine and the output power of the hybrid module). This relates, for example, to the flywheel damper 11 that is only fed the output power from the internal combustion engine 4.

In the rear region 10 of the agricultural work machine 1, other consumers 15 may be arranged that can be supplied by means of the internal combustion engine 4 and the hybrid module 5. In this case, the consumers 15 may be formed by two hydraulic pumps 16 and one PTO shaft 17. To connect these consumers 15 to the internal combustion engine 4 and the hybrid module 5, the output shaft 13 of the hybrid module 12 extends from the hybrid module 5 up to a rear end of the agricultural work machine 1. There, the output shaft 13 interacts with a pump transfer case 24, through which output power taken from the output shaft 13 is distributed to the two hydraulic pumps 16. A clutch 26 is arranged or positioned on the other side of the pump transfer case 24 through which the output shaft 13 may be indirectly coupled to the PTO shaft 17. In this case, a reduction gearing 23 is interposed in the illustrated example.

In one or some embodiments, the output shafts 12, 13 of the internal combustion engine 4 and the hybrid module 5 are arranged or positioned coaxially or at a right angle to each other and are connected to each other. In this manner, the output shafts 12, 13 form output shaft sections of a main output shaft 14 through which the output powers of the agricultural work machine 4 and the hybrid module 5 can be combined with each other. In this way, it is possible to direct output power from the internal combustion engine 4 starting from the front region 9 of the agricultural work machine 1 into the rear region 10 for supplying power to the consumers 15 of the agricultural work machine 1 that are proximate to or in the rear region 10. In this regard, the consumers 15 may also be operated at least in part using the output power from the internal combustion engine 4. In this case, it is contemplated that the main output shaft 14 running from the front region 9 into the rear region 10 at least temporarily transmits exclusively the output power from the internal combustion engine 4, and the consumers 15 are correspondingly driven exclusively by the internal combustion engine 4. Alternatively, it is contemplated for the consumers 15 to be at least temporarily driven exclusively using the hybrid module 5.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Work machine
2 Front axle
3 Rear axle
4 Internal combustion engine
5 Hybrid module
6 Transmission device
7 Front wheel
8 Rear wheel
9 Front region
10 Rear region
11 Flywheel damper
12 Output shaft
13 Output shaft
14 Main output shaft
15 Consumer
16 Hydraulic pump
17 Power take-off shaft
18 Consumer
19 Power take-off shaft
20 Hood
21 Brake
22 Branch
23 Reduction gearing
24 Pump transfer case
25 Clutch
26 Clutch
27 Clutch
28 Differential gear
29 Differential gear
30 Ground
31 Branch

The invention claimed is:
1. An agricultural work machine comprising:
a front axle and rear axle;
an internal combustion engine;
at least one hybrid module; and
a transmission device,
wherein the internal combustion engine and the hybrid module are each operatively connected to the transmission device,
wherein the transmission device is configured to absorb both output power from the internal combustion engine and output power from the hybrid module,
wherein the agricultural work machine is configured to transfer the output power from the internal combustion engine and the output power from the hybrid module together to the rear axle to drive rear wheels of the agricultural work machine arranged on the rear axle,
wherein the internal combustion engine is positioned in a front region of the agricultural work machine,
wherein the hybrid module is positioned in a rear region of the agricultural work machine being spatially arranged between the rear wheels of the agricultural work machine,
wherein a center of gravity of the hybrid module is located in an imaginary cylinder space formed by the rear wheels;
wherein the hybrid module is integrated into or positioned on the rear axle; and
wherein the agricultural work machine is configured to separately supply the output power of the internal combustion engine and the output power of the hybrid module to transmission device.

2. The agricultural work machine of claim 1, wherein the hybrid module comprises one or more of an electric motor, a hydraulic motor, an electric machine, or a hydromachine.

3. The agricultural work machine of claim 1, further comprising a flywheel damper configured to interact with an output shaft of the internal combustion engine is positioned in front of the transmission device viewed from the internal combustion engine.

4. The agricultural work machine of claim 1, wherein the transmission device is spatially arranged between the rear wheels.

5. The agricultural work machine of claim 1, wherein an output shaft of the internal combustion engine and an output shaft of the hybrid module are positioned coaxially or at a right angle to each other; and
wherein the output shaft of the internal combustion engine and the output shaft of the hybrid module are connected to each other so as to transmit torque and jointly form a main output shaft.

6. The agricultural work machine of claim 5, wherein the main output shaft runs from the internal combustion engine into the rear region of the agricultural work machine.

7. The agricultural work machine of claim 6, wherein the main output shaft in the rear region interacts with at least one consumer.

8. The agricultural work machine of claim 6, wherein the main output shaft in the rear region interacts with a plurality of consumers.

9. The agricultural work machine of claim 8, wherein the plurality of consumers comprise one or both of at least one hydraulic pump or at least one PTO shaft.

10. An agricultural work machine comprising:
a front axle and rear axle;
an internal combustion engine;
at least one hybrid module; and
a transmission device,
wherein the internal combustion engine and the hybrid module are each operatively connected to the transmission device,
wherein the transmission device is configured to absorb both output power from the internal combustion engine and output power from the hybrid module,
wherein the agricultural work machine is configured to transfer the output power from the internal combustion engine and the output power from the hybrid module together to the rear axle to drive rear wheels of the agricultural work machine arranged on the rear axle,
wherein the internal combustion engine is positioned in a front region of the agricultural work machine,
wherein the hybrid module is positioned in a rear region of the agricultural work machine,
wherein the agricultural work machine is configured to separately supply the output power of the internal combustion engine and the output power of the hybrid module to transmission device,
wherein an output shaft of the internal combustion engine and an output shaft of the hybrid module are connected to each other so as to transmit torque and jointly form a main output shaft,
wherein the main output shaft in the rear region interacts with a plurality of consumers and
wherein the hybrid module, viewed from the internal combustion engine, is connected on a near side of at least one of the plurality of consumers to the main output shaft so that the at least one of the plurality of consumers is supplied with combined power as needed from the internal combustion engine and the hybrid module.

11. The agricultural work machine of claim 1, wherein an output shaft of the internal combustion engine is configured to interact with at least one consumer in the front region of the agricultural work machine.

12. The agricultural work machine of claim 11, wherein the output shaft is configured to interact with a plurality of consumers, with the output shaft configured to be coupled with at least one PTO shaft.

13. The agricultural work machine of claim 1, further comprising at least one power generator that is positioned in the rear region of the agricultural work machine proximate to the rear axle; and
wherein a main output shaft is configured to drive the at least one power generator.

14. The agricultural work machine of claim 1, wherein the internal combustion engine includes an output shaft;
wherein the hybrid module includes an output shaft; and
wherein each of the output shaft of the internal combustion engine and the output shaft of the hybrid module are designed to accommodate less than a sum of the output power of the internal combustion engine and the output power of the hybrid module.

15. The agricultural work machine of claim 1, wherein the output power from the internal combustion engine and the output power from the hybrid module are supplied separately to the transmission device through separate drivetrain sections.

16. The agricultural work machine of claim 1, wherein the hybrid module is integrated in the rear axle.

17. The agricultural work machine of claim 1, wherein the internal combustion engine includes an output shaft configured to supply output power generated by the internal combustion engine to the transmission device;
wherein the at least one hybrid module includes an output shaft configured to supply output power generated by the at least one hybrid module to the transmission device;
wherein the output power generated by the internal combustion engine and the output power generated by the at least one hybrid module are supplied separately to the transmission device; and
wherein the output shaft of the internal combustion engine and the output shaft of the at least one hybrid module are both designed to accommodate less than a sum of the output power generated by the internal combustion engine and the output power generated by the at least one hybrid module.

18. The agricultural work machine of claim 1, wherein at least 50% of deadweight of the hybrid module is diverted into ground through the rear wheels.

* * * * *